(12) United States Patent
Watanabe et al.

(10) Patent No.: US 7,668,570 B2
(45) Date of Patent: Feb. 23, 2010

(54) INFORMATION PROCESSING APPARATUS AND INFORMATION PROCESSING PROGRAM

(75) Inventors: Hiroyuki Watanabe, Ome (JP);
Hiromasa Takato, Kawasaki (JP);
Hiroto Yoshihara, Ichikawa (JP);
Takahisa Yoneyama, Yokohama (JP);
Makoto Taki, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1053 days.

(21) Appl. No.: 10/916,099

(22) Filed: Aug. 11, 2004

(65) Prior Publication Data

US 2005/0073521 A1 Apr. 7, 2005

(30) Foreign Application Priority Data

Aug. 12, 2003 (JP) ............................. 2003-292347

(51) Int. Cl.
*H04B 1/38* (2006.01)
(52) U.S. Cl. .................. 455/566; 455/67.11; 455/226.2
(58) Field of Classification Search ................. 370/329, 370/332; 455/67.11, 226.2, 566
See application file for complete search history.

(56) References Cited

U.S. PATENT DOCUMENTS 5,933,420 A * 8/1999 Jaszewski et al. ........... 370/329

6,134,445 A 10/2000 Gould et al.

FOREIGN PATENT DOCUMENTS

| EP | 1107512 A1 | 6/2001 |
|----|-----------|--------|
| JP | 11-134343 | 5/1999 |
| JP | 11-143676 | 5/1999 |
| JP | 11231997 | 8/1999 |
| JP | 2000-76267 | 3/2000 |
| JP | 2001-25060 | 1/2001 |
| JP | 2002-281468 | 9/2002 |
| JP | 2002342122 | 11/2002 |
| WO | WO 01/74011 A1 | 10/2001 |
| WO | WO 03/007549 A1 | 1/2003 |

OTHER PUBLICATIONS

Garmin eMap; electronic map; owner's manual and reference guide; Jul. 2001.
Office Action.

* cited by examiner

*Primary Examiner*—Temica M Beamer
(74) *Attorney, Agent, or Firm*—Knobbe, Martens, Olson & Bear LLP (57) ABSTRACT

An information processing apparatus comprises a wireless communication unit which discovers wireless devices existing in surroundings, and a display unit which displays a list of wireless devices discovered by the wireless communication unit as selectable objects in which display icons of the objects are based on radio intensities of the discovered wireless devices.

20 Claims, 10 Drawing Sheets

| Frequency | Star icon | Color | Text | Sound (appearance, selection or the like) |
|---|---|---|---|---|
| High | ☆ | Orange | Always discovered | A |
| Middle | □ | Yellow | Frequently discovered | B |
| Low | ◎ | Blue | Sometimes discovered | C |
| Initial | ○ | White | First time | D |

FIG. 11

FIG. 12 double click

FIG. 13

INFORMATION PROCESSING APPARATUS AND INFORMATION PROCESSING PROGRAM

This application is based upon and claims the benefit of priority from Japanese Patent Application No. 2003-292347, filed Aug. 12, 2003, the entirety of which are hereby incorporated herein by reference.

BACKGROUND OF THE INVENTION

1. Field of the Invention

The present invention relates to an information processing apparatus capable of performing wireless communication. Moreover, the present invention relates to a program applied to a miniature electronic, such as, for example, a notebook type personal computer or a PDA (personal digital assistant), which is capable of performing wireless communication and which is easily carried.

2. Description of the Related Art

Generally, in an information processing apparatus such as a personal computer, a network device such as a wired LAN device is provided. The network device is used for connecting a computer to a network. By connecting the computer to a network such as Internet or the like, it is possible to acquire information from other computers on the network and to share information with the other computers. In many personal computers, an operating system for supporting a network connecting function is used. Therefore, even a user who does not have technical knowledge relating to networks can connect a computer to a network such as Internet or the like.

In recent years, a miniature information processing device such as a notebook type personal computer or a PDA is capable of discovering an access point of a wireless LAN existing in the surroundings under the usage environment, and of carrying out a network connection via the access point. Further, a function of visually carrying out monitoring of a network has been achieved as disclosed in Japanese Patent Application KOKAI Publication No. 11-231997.

However, when the portable personal computer, the PDA, or the like described above is carried to use, a communication environment must be recognized on a wireless device in the surroundings. However, there has been the problem that the recognition thereof cannot be easily carried out in a prior art.

SUMMARY OF THE INVENTION

An embodiment of the invention is directed to method and apparatus that substantially obviates one or more of the problems due to limitations and disadvantages of the related art.

In an embodiment, an object of the invention is to provide an information processing apparatus and an information processing program by which a communication environment can be easily recognized on a wireless device in the surroundings.

According to an embodiment of the invention, an information processing apparatus comprises a wireless communication unit which discovers wireless devices existing in surroundings, and a display unit which displays a list of wireless devices discovered by the wireless communication unit as selectable objects in which a display icon of the object is accompanied with a predetermined movement.

According to an embodiment of the invention, an article of manufacture comprising a computer usable medium having computer readable program code embodied therein, the computer readable program code comprises computer readable program code for causing a computer to discover wireless devices existing in surroundings, and computer readable program code for causing a computer to display a list of wireless devices discovered by the wireless communication unit as selectable objects in which a display icon of the object is accompanied with a predetermined movement.

According to an embodiment of the invention, an information processing apparatus comprises a wireless communication unit which discovers wireless devices existing in surroundings, and a display unit which displays a list of the discovered wireless devices as selectable objects in which display icons of the objects are displayed based on radio intensities of the discovered wireless devices.

According to an embodiment of the invention, an article of manufacture comprises a computer usable medium having computer readable program code embodied therein where the computer readable program code comprises computer readable program code that is configured to cause a computer to discover wireless devices existing in surroundings, and computer readable program code that is configured to display a list of discovered wireless devices as selectable objects in which display icons of the objects are displayed based on radio intensities of the wireless devices.

According to an embodiment of the invention, an information processing method comprises discovering with a wireless communication unit available wireless devices, and displaying a list of the discovered available wireless devices as selectable objects, in which display icons of the objects are displayed based on radio intensities of the discovered available wireless devices.

According to an embodiment of the invention, an information processing apparatus comprises a means for discovering available wireless devices, and a means for displaying a list of the discovered available wireless devices as selectable objects, in which display icons of the objects are displayed based on radio intensities of the discovered available wireless devices.

Additional objects and advantages of embodiments of the invention will be set forth in the description which follows, and in part will be obvious from the description, or may be learned by practice of embodiments of the invention.

The objects and advantages of the invention may be realized and obtained by the instrumentation and combinations particularly pointed out hereinafter.

BRIEF DESCRIPTION OF THE DRAWINGS

The accompanying drawings, which are incorporated in and constitute a part of the specification, illustrate embodiments of the invention and, together with the general description given above and the detailed description of the embodiments given below, serve to explain the principles of the invention in which.

DETAILED DESCRIPTION OF THE PREFERRED EMBODIMENT

An embodiment of an information processing apparatus will now be described with reference to the accompanying drawings.

Figure 1:
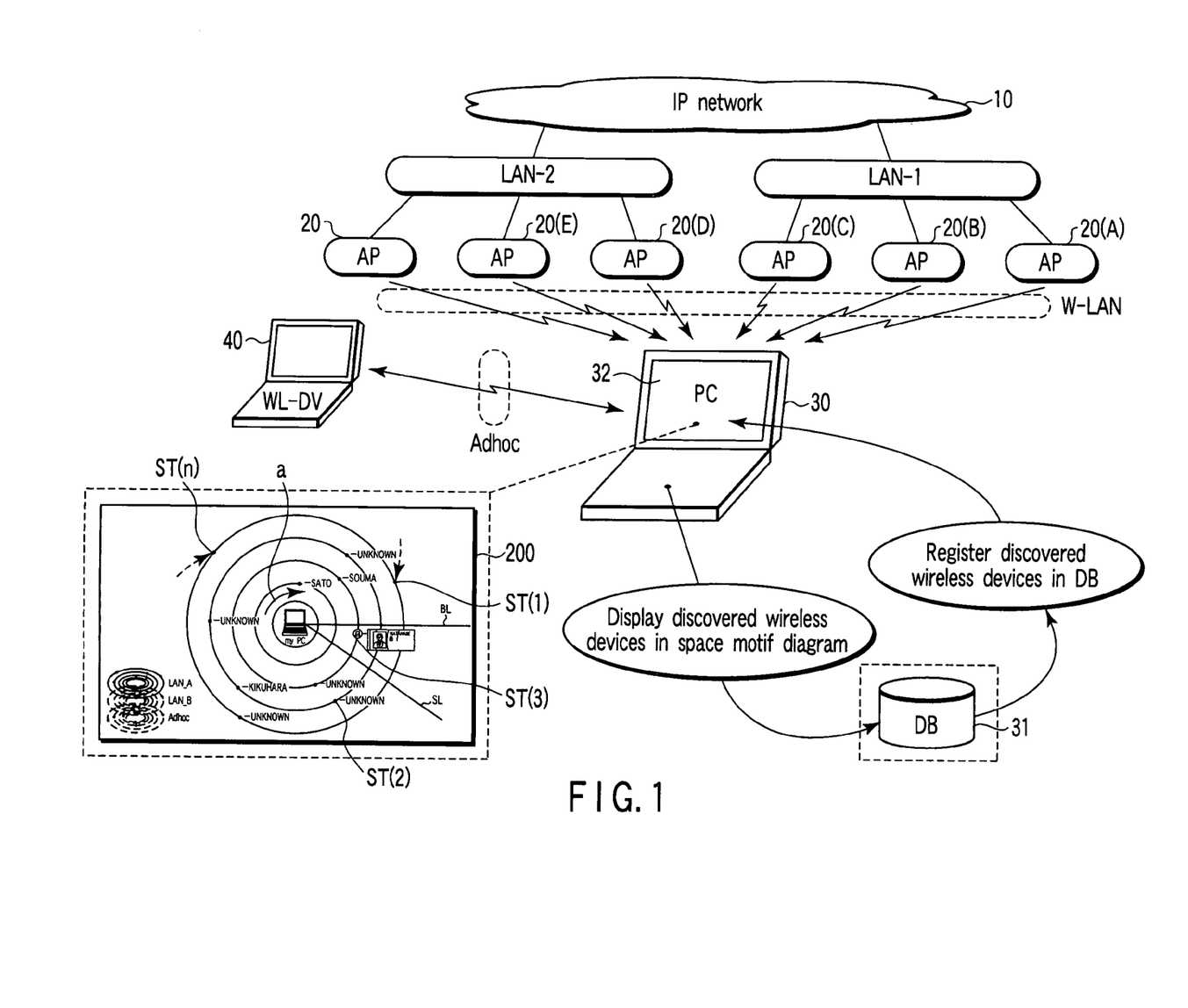
FIG. 1 is a diagram of a system configuration for explaining an outline of functions of an information processing apparatus according to an embodiment of the invention.
Figure 2:
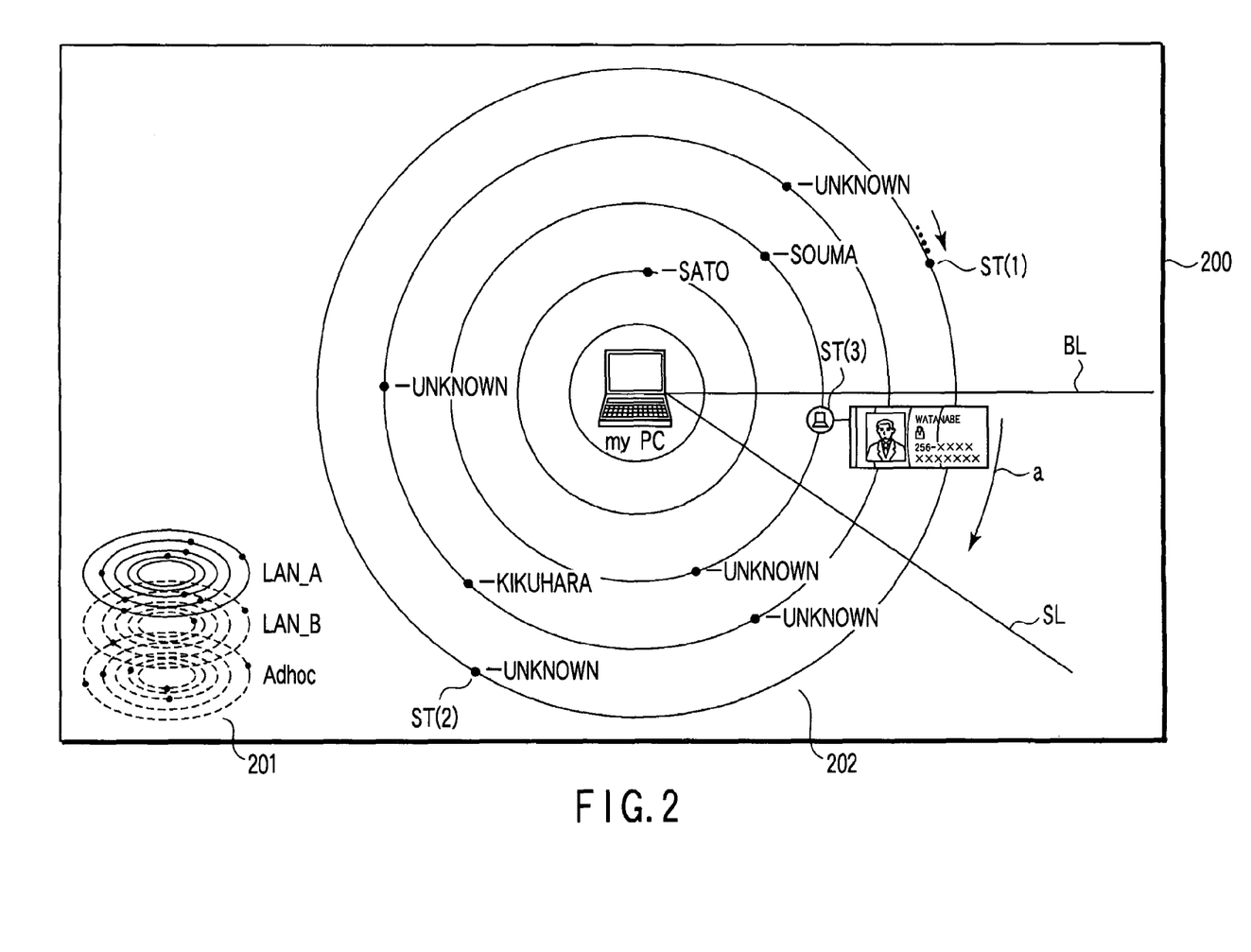
FIG. 2 is a diagram illustrating an example of a configuration of a communication environment display screen according to an embodiment of the invention.

FIG. 1 illustrates a system configuration example for explaining the outline of functions of an information processing apparatus according to the embodiment of the invention. FIG. 2 illustrates a screen example of a graphic user interface (GUI) which is displayed on a display device of the information processing apparatus shown in FIG. 1.

As shown in FIG. 1, a wireless LAN access area (W-LAN) forms a communication network by using a LAN on a specific area and an IP network 10 or the like. Within the wireless LAN access area (W-LAN) or the LAN area on a specific area, although not illustrated, servers for a printer, a network, a file, or the like are provided. Within the wireless LAN access area (W-LAN), access points (AP) 20 of the wireless LAN are provided.

A terminal serving as a client is realized by, for example, a portable personal computer (PC) 30. The personal computer 30 is capable of connecting to the access points 20 within the wireless LAN access area by the wireless LAN, and of making a network connection to the respective servers described above, and moreover, to an arbitrary device via the IP network 10. As a display function of the personal computer 30, a wireless device display function in which the wireless devices existing in the surroundings is monitored. All of the discovered wireless devices are list-displayed in a space motif diagram, which is imitative of celestial bodies in outer space. Reference numeral 40 denotes another wireless device (WL-DV) which can be connected via a wireless ad hoc network (ad hoc) described later. Reference numeral 31 denotes a data base (DB) which is provided at a hard disk drive (HDD) 106 described later, and which manages the discovered wireless devices.

The personal computer 30 comprises a display device 32 formed of a color LCD or the like. As shown in an enlarged manner in FIG. 2, the display device 32 displays a list of wireless devices, such as access points 20 or the like, which have been discovered by a wireless communication unit described later so as to be selectable in a display screen in which the wireless devices are regarded as the celestial bodies in orbit which are imitative of the solar system or galactic system in outer space.

As shown in FIG. 2, a communication environment display screen (space motif diagram) 200 with the space as a motif is displayed on the display device 32 by a communication environment display control program which will be described later. The communication environment display screen 200 comprises a network type selection screen (called a small scale monitor screen) 201 on which the above-described outer space is reduced and displayed, and a main screen (called a network selection menu screen) 202 on which the above-described outer space is enlarged and displayed. The small scale monitor screen 201 and the network selection menu screen 202 may be configured so as to be respectively displayed independently, separately, and selectively at the communication environment display screen 200, or may be configured so as to be displayed in a form in which the both are associated with one another. In an embodiment, in order to avoid an interference with (being not superposed on) other windows, the small scale monitor screen 201 is first displayed, and when one network type (called a network group) is selected on the small scale monitor screen 201, the network selection menu screen 202 of the selected network group is displayed. At this time as well, a screen configuration in which both of the small scale monitor screen 201 and the network selection menu screen 202 are displayed together at the communication environment display screen 200, and a screen configuration in which, when the network selection menu screen 202 is displayed, the small scale monitor screen 201 is being turned off until the time when the network selection menu screen 202 is closed, can be considered. In an embodiment, a screen configuration is used in which the small scale monitor screen 201 is displayed on the communication environment display screen 200, and the network selection menu screen 202 is selectively displayed.

Plural layer (here, five layer) elliptical orbits whose diameters are different from one another are displayed on the small scale monitor screen 201. Among these five layer elliptical orbits, the elliptical orbit of one layer is selected under a predetermined condition such as, for example, a radio intensity of the discovered wireless device, or the like. The wireless devices such as the access points 20, which have been discovered by the wireless communication unit described later, are displayed in a display screen imitative of celestial bodies so as to orbit at a predetermined speed in orbit.

On the small scale monitor screen 201, with the above-described five layer elliptical orbits as one set, in units of wireless communication environment such as a wireless local area network or a wireless ad hoc network, or in units of the classes of a network, plural sets of five layer elliptical orbits are displayed as selectable object screens. In an embodiment, the total three sets of selectable object screens (comprising the five layer elliptical orbits): two sets of the wireless local area networks of "LAN_A" and "LAN_B", and one set of the wireless ad hoc networks denoted by "Ad hoc", are respectively displayed as selectable objects by using mouse-clicks. In the drawing, the selected selectable object screen is shown by the solid lines, and the unselected selectable object screens are shown by the broken lines.

Plural layer (here five layer) circular orbits whose diameters are different from one another are displayed on the network selection menu screen 202. Among these five layer elliptical orbits, the orbit of one layer is selected based on a predetermined condition such as, for example, a radio intensity of the discovered wireless device, or the like, and the wireless devices such as the access points 20 which have been discovered by the wireless communication unit described later are displayed as selectable objects so as to orbit in the direction of the arrow "a" shown in the drawing at a predetermined speed in orbit by icons ST(1), ST(2), etc.

Moreover, the network selection menu screen 202 has a focus line (BL) extending from the center in a radial pattern, and has a focusing function of displaying the details of the objects on the basis of the object data which will be described later at a predetermined focus area (here, an area between BL and SL) determine in advance, when the respective objects of the wireless devices, which have been discovered by the wireless communication unit described later, pass over the focus line (BL). Note that "UNKNOWN" in the drawing denotes an unknown (unregistered) object.

Figure 3:
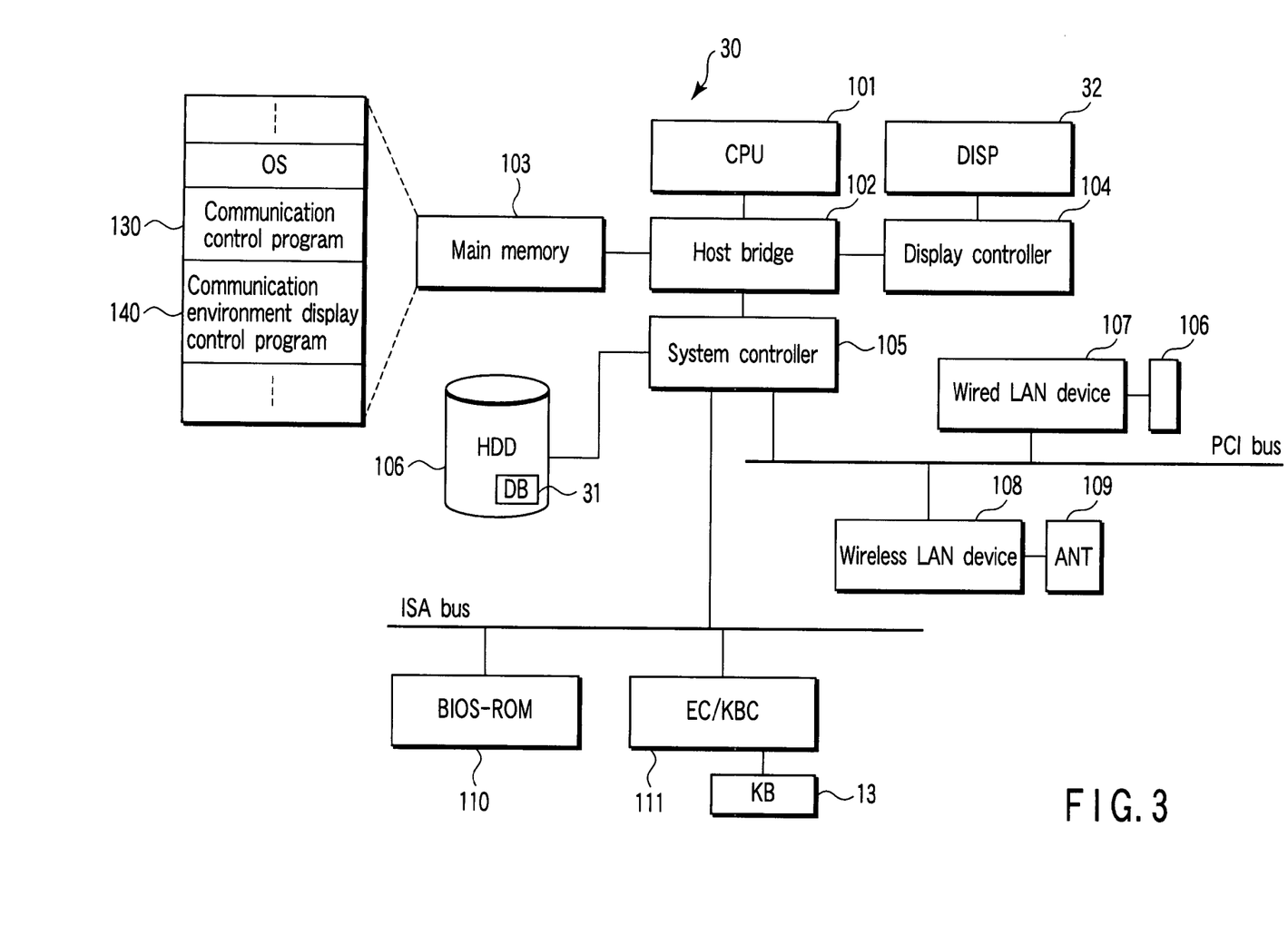
FIG. 3 is a block diagram showing a hardware configuration of the information processing apparatus according to an embodiment of the invention.

The system configuration of the above-described personal computer 30 will be described with reference to FIG. 3.

The personal computer 30 comprises a CPU 101, a host bridge 102, a main memory 103, a display controller 104, a system controller 105, a hard disk drive (HDD) 106, a wired LAN device 107, a wireless LAN device 108, a BIOS-ROM 110, an embedded controller/keyboard controller IC (EC/KBC) 111, and the like.

Figure 5:
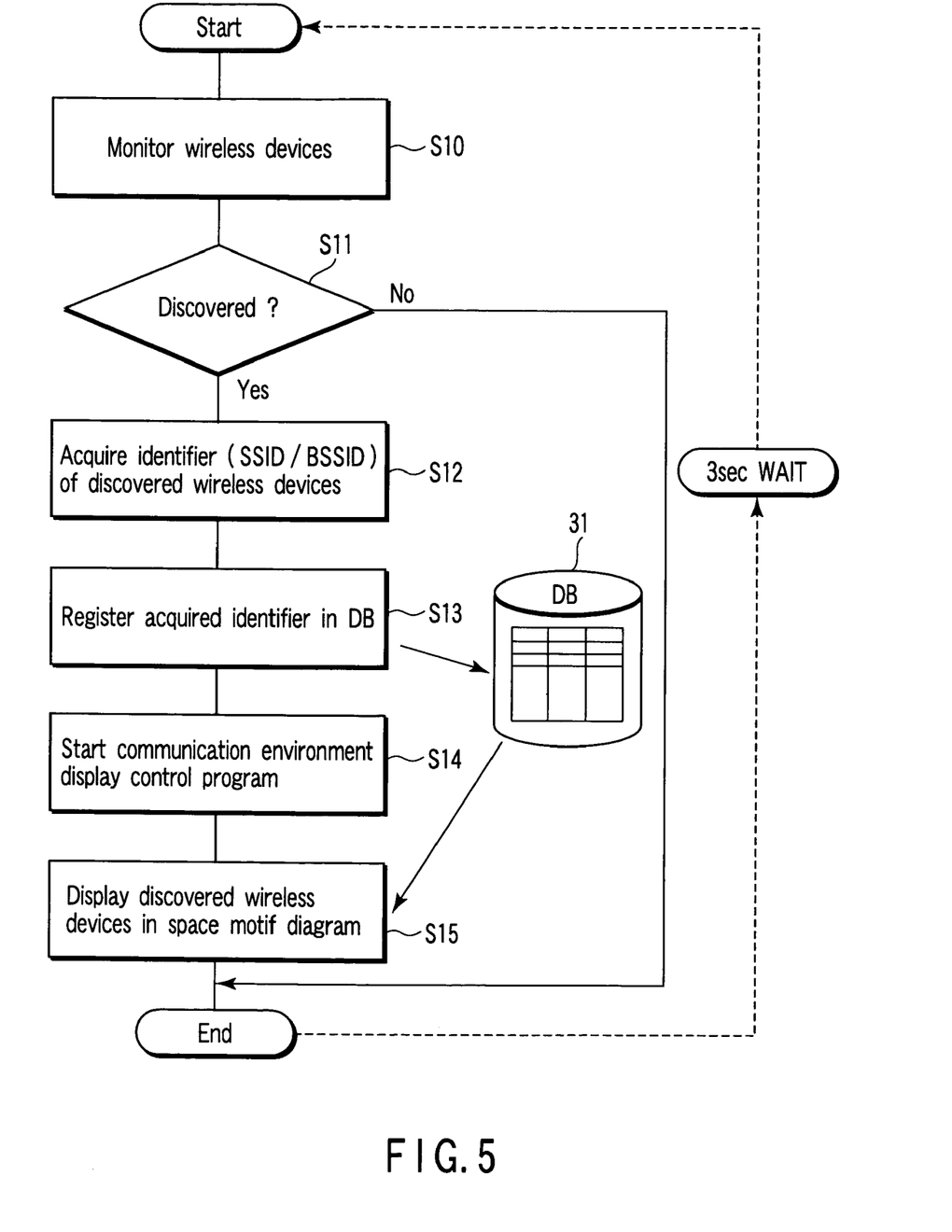
FIG. 5 is a flowchart showing the procedure of the processing of a part of a communication control program according to an embodiment of the invention.
Figure 6:
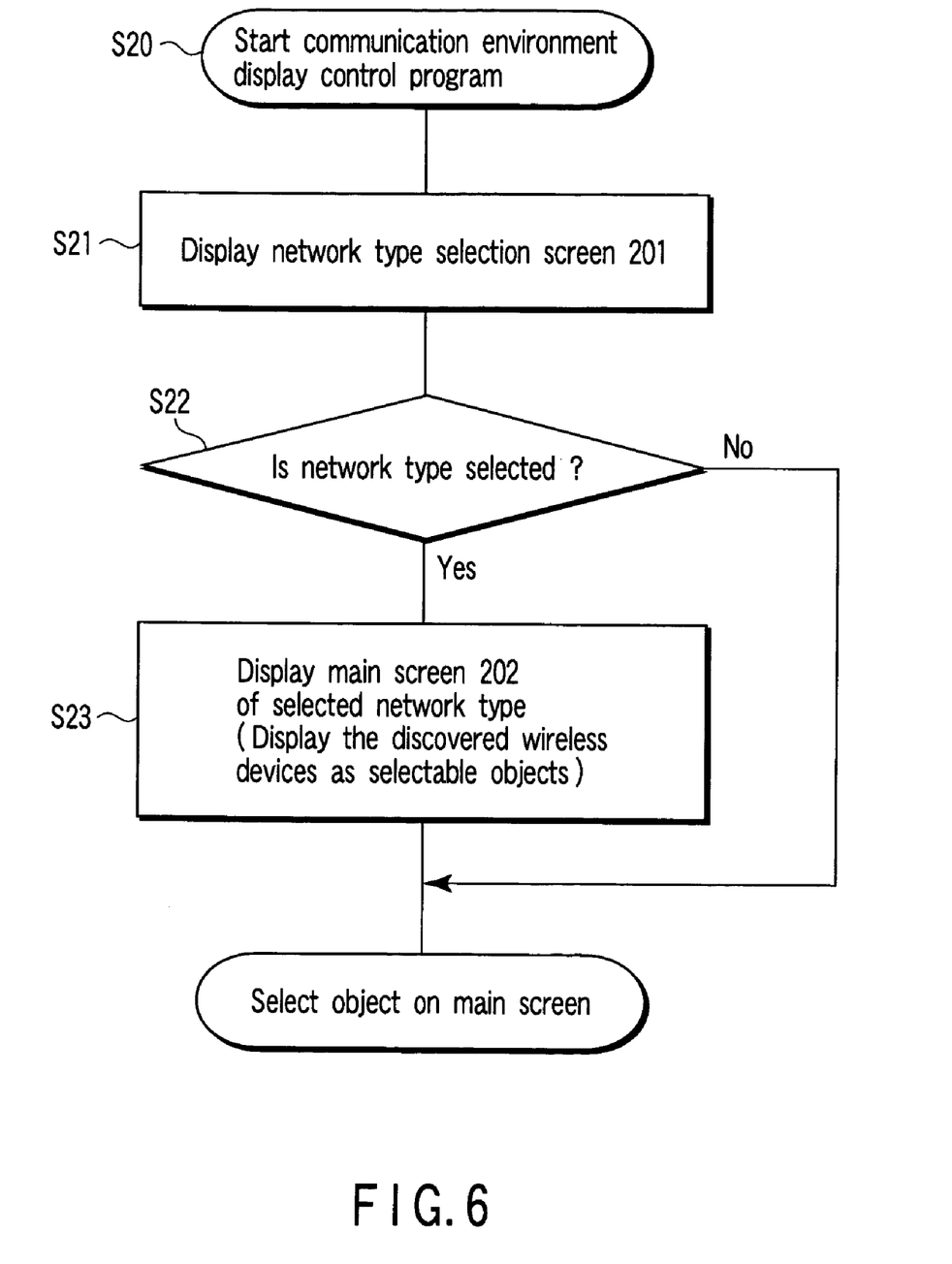
FIG. 6 is a flowchart showing the procedure of the processing of a communication environment display control program according to an embodiment of the invention.
Figure 7:
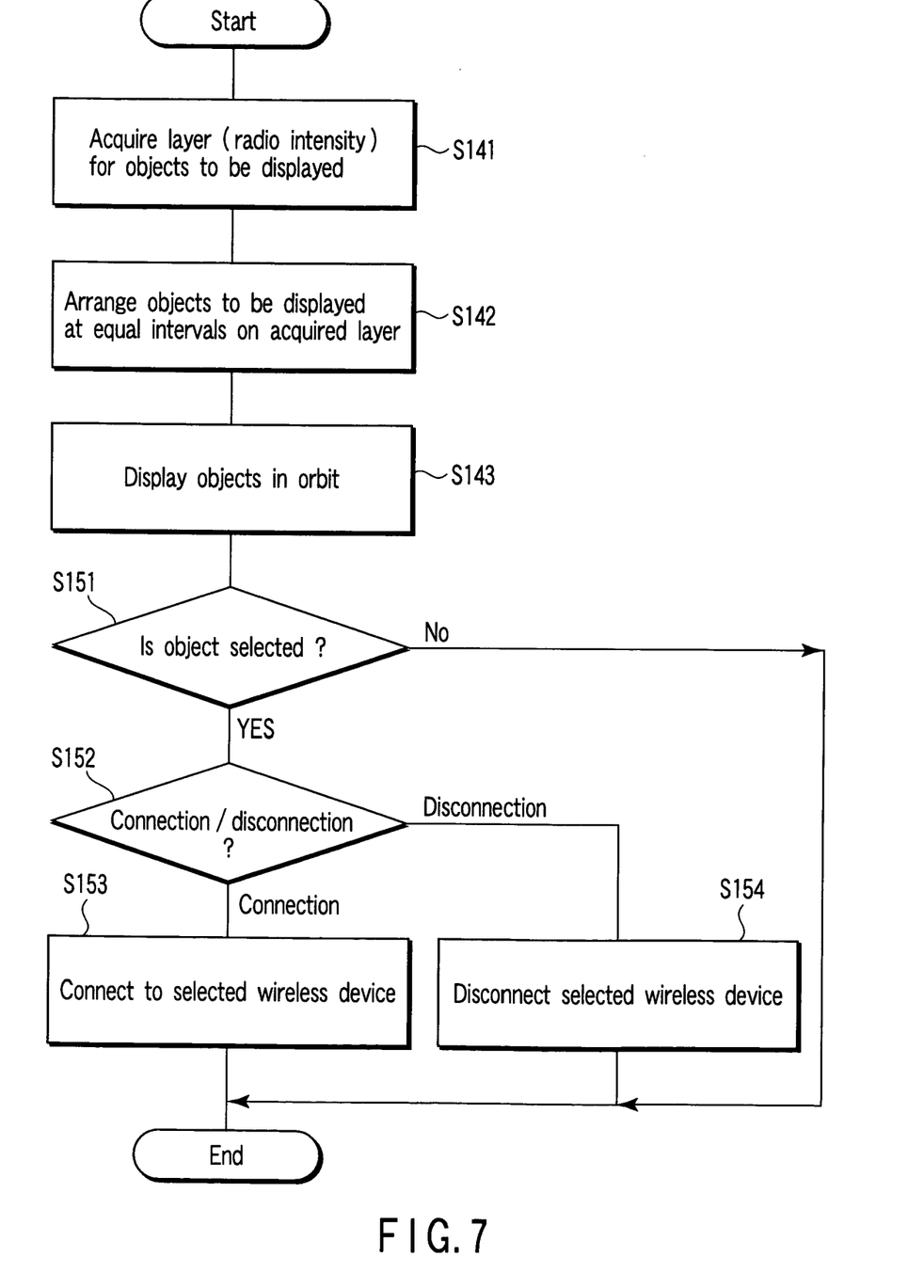
FIG. 7 is a flowchart showing the procedure of the processing of the communication environment display control program according to an embodiment of the invention.

The CPU 101 is a processor provided for controlling the operation of the computer, and executes an operating system (OS) and various application/utility programs which are loaded from the hard disk drive (HDD) 106 to the main memory 103. The CPU 101 also executes a BIOS (Basic Input Output System) stored in the BIOS-ROM 110. The CPU 101 executes a communication control program 130 stored in the main memory 103 in accordance with a predetermined setting condition (for example, at constant time intervals), and executes application processing relating to the communication service comprising monitoring of the wireless devices existing in the surroundings, collecting information of the discovered wireless devices, or the like, as shown in FIG. 5. Moreover, the CPU 101 executes a communication environment display control program 140 stored in the main memory 103 by, for example, selecting icons by a user, or the like, and carries out display control on the communication environment display screen 200 and notification control to the communication control program 130 as shown in FIGS. 6 and 7. These respective processes will be described with reference to the drawings.

As one of the utility programs, the communication control program 130 is installed in advance in the personal computer 30. The communication control program 130 manages communication control of the computer, and has a function of registering and storing network setting environments at respective usage places whose communication environments, such as, for example, a user's own home or an office, are different from one another, as communication profiles. The communication control program 130 also has a function of automatically network setting with respect to the better communication environment by using the above-described communication profile, and a function of automatically switching to a wireless network due to the disconnection of a cable under the state of wired network connection, and the like.

As the above-described communication profiles, a profile name, a comment on a profile, an icon, a capture item (Internet setting; proxy setting, a start homepage etc., device; a wired network device, a wireless network device, an infrared device etc., TCP/IP setting; DHCP, an IP address, a subnet mask, a default gateway, a DNS server, a WINS server etc.), a starting program after switching, or the like, can be appropriately set by being sorted out in accordance with communication environment to be used thereby.

Moreover, the above-described communication control program 130 is capable of storing and managing the number of discoveries of the respective access points 20 which can be communicated with. Here, when the wireless LAN device 108 receives a beacon (RB) of the access point 20, an identifier (BSSID/SSID) of the access point 20 whose beacon (RB) has been received is acquired, and the access point 20 which has been discovered (whose beacon (RB) has been received) is registered in the data base (DB) 31, and moreover, the number of discoveries of the registered respective access points 20 are counted and managed on the data base 31. The data base 31 is managed by the communication control program 130 on the hard disk drive 106.

Moreover, as one of the utility programs, the communication environment display control program 140 is installed in advance in the personal computer 30. The communication environment display control program 140 provides a graphic user interface function in which the wireless communication environment is reflected on the communication environment display screen 200 on the basis of monitoring processing, which is executed by the communication control program 130, of the wireless devices existing in the surroundings, and information collecting processing of the wireless devices discovered by the monitoring, and the discovered wireless devices and the details thereof are displayed so as to be selectable in a display screen easily looked by a user. The details of the processes by the communication environment display control program 140 will be described later with reference to FIGS. 7 to 13.

The host bridge 102 is a bridge device for connecting between the local bus of the CPU 101 and the system controller 105. A memory controller for access-controlling the main memory 103 is incorporated in the host bridge 102. The display controller 104 controls the display unit (DISP) 32, using, for example, an LCD to be used as a display monitor. In an embodiment, display control of the communication environment display screen 200 having the small scale monitor screen 201 and the network selection menu screen 202 as shown in FIG. 2 is carried on the display unit (DISP) 32 under the control of the communication environment display control program 140.

The system controller 105 controls the respective devices on a PCI bus and the respective devices on an ISA bus. An IDE controller for controlling the hard disk drive 106 as well is incorporated in the system controller 105. The data base (DB) 31 for achieving the application function relating to communication service described above and the communication environment display function shown in FIG. 2 is stored in the hard disk drive 106, and is managed by the communication control program 130, and the data base (DB) 31 is referred by the communication environment display control program 140.

The wired LAN device 107 is a wired network device for connecting to a wired network. The wired LAN device 107 makes communication with a wired network via a wired LAN cable connected to a LAN connector 106.

The wireless LAN device 108 is a wireless network device for connecting to a wireless network, and comprises a base band unit and an RF unit. The RF unit sends and receives wireless signals via an antenna (ANT) 109. The wireless LAN device 108 is configured so as to execute wireless communication in accordance with, for example, IEEE 802.11a/IEEE 802.11b standards. Here, when the wireless LAN device 108 receives a beacon (RB) transmitted from the access point (AP) 20, the wireless LAN device 108 notifies the CPU 101 of that fact.

The embedded controller/keyboard controller IC (EC/KBC) 111 is a one-chip microcomputer into which an embedded controller for managing electric power and a keyboard controller for controlling a keyboard 13 are integrated. The embedded controller/keyboard controller IC (EC/KBC) 111 is capable of turning power of the computer on/off in accordance with an operation of a power button by a user.

Figure 4:
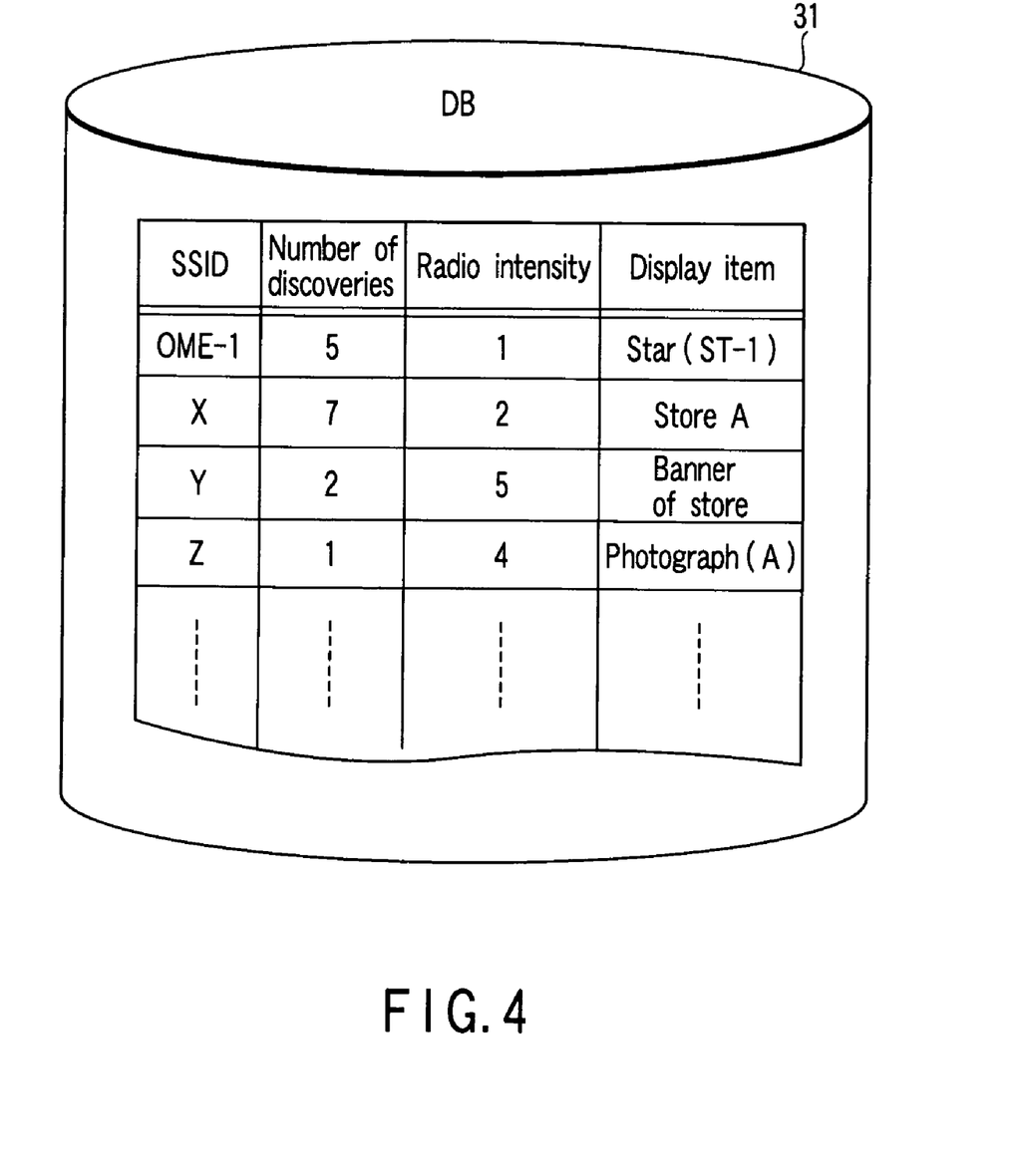
FIG. 4 is a diagram showing a configuration example of a data base according to an embodiment of the invention.

One example of a configuration of the data base 31 which is managed by the communication control program 130 and is referred by the communication environment display control program 140 is shown in FIG. 4. Here, under the control of the communication control program 130 to be executed by the CPU 101, the identifier (SSID/BSSID) of the discovered access points 20, the number of discoveries thereof (counter), the radio intensities, and the display items are stored in the data base 31 so as to be respectively associated with one another, and those are managed by control numbers (not shown).

The processing procedure of the application processing relating to communication service in the communication control program 130 is shown in FIG. 5. Note that, here, the processing up to the processing of reading data for displaying the discovered wireless devices on the communication environment display screen 200 is the processing of the communication control program 130, and the display control of the wireless devices on the communication environment display screen 200 based on the read data is taken over to the communication environment display control program 140. There are cases in which this taking-over is automatically carried out and is manually carried out. As an example in which the taking-over is automatically carried out, there is a method in which the communication environment display control program 140 is started up under the control of the communication control program 130 when a new wireless device is discovered by the processing of the communication control program 130 (or at constant time intervals). Or, there is a method in which, when a variation in the wireless communication environment (for example, an access point of a new wireless LAN network is discovered, a network area of a wireless LAN is switched, for example, from the office to the user's own home, or the like) of the user's own device (personal computer 30) is recognized by the processing of the communication control program 130, the communication environment display control program 140 is started up under the control of the communication control program 130. Further, as an example in which the taking-over is manually carried out, there is a start-up method by clicking an icon and a start-up method by operating a specific key by a user. Thus, the automatic/manual start-up of the communication environment display control program 140 can be selected, whereby an apparatus which is easier to handle can be achieved. Here, the operational example is shown in which the communication environment display control program 140 is started under the control of the communication control program 130.

In the application processing relating to communication service, the CPU 101 executes the application processing relating to communication service, as shown in FIG. 5, which is included in the communication control program 130, at predetermined time intervals. In this processing, at predetermined time intervals (for example, every three seconds), processing of receiving a beacon (RB) by the wireless LAN device 108 is executed, and the wireless devices (in this example, the access points) existing in the surroundings and which can be communicated with are monitored (step S10 in FIG. 5). In this processing, when the CPU 101 is informed of the fact that the wireless LAN device 108 receives a beacon (RB) transmitted from the access point 20 within a wireless LAN access area (W-LAN), i.e., the fact that the wireless device existing within a range (the surroundings) in which it is possible to communicate with the wireless LAN device 108 is discovered (YES in step S11), the CPU 101 acquires the identifier (SSID/BSSID) of the discovered access point 20 (step S12). When the identifier of the access point 20 has been already registered in the data base 31 shown in FIG. 4, the counter of the discovered access point 20 is incremented, and the number of discoveries is updated. Further, when the identifier (SSID/BSSID) of the discovered access point 20 has not been registered in the data base 31, the identifier of the discovered access point 20 is newly registered in the data base 31. At this time, the number of discoveries "1" is set to the counter of counting the number of discoveries (step S13).

In accordance with the control, the identifier (SSID/BSSID) of the discovered wireless device is registered in, the data base 31, and when a registered wireless device is further discovered, the number of discoveries of the wireless devices is updated (incremented) each time. Further, the detailed information of the highly reliable wireless devices are registered in a display item region with the above-described data base 31. In the data base structure shown in FIG. 4, the respect fields of the identifier (SSID/BSSID), the number of discoveries, the radio intensities of the discovered wireless devices are shown. However, in addition thereto, the fields for an access point name, a LAN model, a connection history, and the like are provided, whereby many object related information can be provided to a user on display of the detailed information shown in FIG. 2. Moreover, with respect to the highly reliable and well-known wireless devices, due to the fields for a photograph of a face, an image, sound, and the like being provided, more effective detailed information can be provided. For example, a banner of a store in which photographs, texts, images, sounds and the like are combined, or the like is registered, and it can be provided as the detailed information shown in FIG. 2. In this way, processing of monitoring the presence of the wireless devices, processing of acquiring the information of the discovered wireless devices, processing of storing the acquired information in the data base 31, and the like are executed in accordance with the communication control program 130.

In the processing of the communication control program 130 described above, when a variation in the wireless communication environment (for example, the network area of the wireless LAN is switched from the office to the user's own home, or the like) is detected, the communication environment display control program 140 is started under the control of the communication control program 130 (step S14), and object display using the communication environment display screen (space motif diagram) 200 shown in FIG. 2 is carried out under the control of the communication environment display control program 140 (step S15).

The processing procedure of the communication environment display control program 140 is shown in FIGS. 6 and 7. Here, at the time of displaying the network selection menu screen (main screen) 202, first, the small scale monitor screen (network type selection screen) 201 is displayed (step S21 in FIG. 6).

Figure 8:
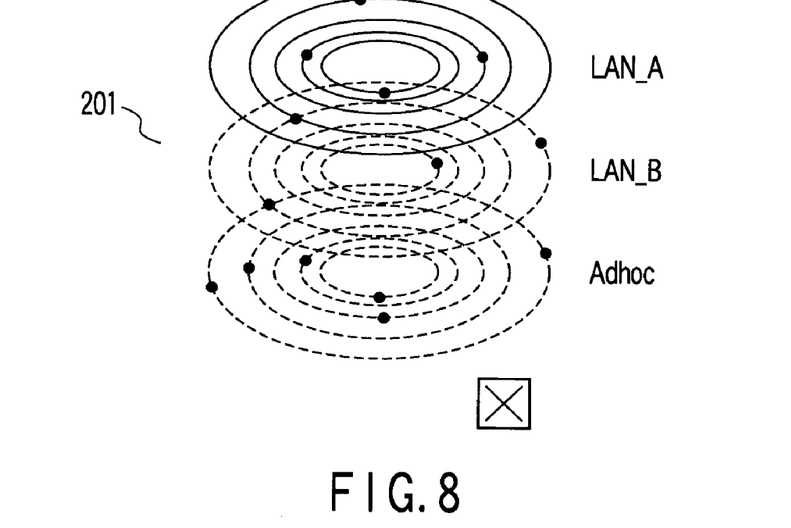
FIG. 8 is a diagram illustrating a display example of a user interface according to an embodiment of the invention.

On the small scale monitor screen 201, as one example is shown in an enlarged manner in FIG. 8, with the five layer elliptical orbits as one set, the total three sets of "LAN_A", "LAN_B", and "Ad hoc" are respectively displayed as selectable object screens (items) for selecting a network type (network group). In the drawing, one set of selectable object screen in an active state is shown by the solid lines, and the other selectable object screens are shown by the broken lines. The discovered wireless devices are respectively displayed with being imitative of stars (celestial bodies) at the layers of the above-described respective selectable object screens, and travel and orbit at a predetermined speed in orbits. At this time, the layers for the stars (celestial bodies) which are displayed in orbit and which express the wireless devices are respectively determined in accordance with the radio intensities of the wireless devices at the time of being discovered.

When one network type (network group) is selected on the small scale monitor screen 201 (step S22 in FIG. 6), for example, when the wireless "LAN_A" is selected, the network selection menu screen (main screen) 202 of the selected network type (network group) is displayed (step S23). This display state example is shown in FIG. 2. Further, the display processing procedure of the objects on the above-described network selection menu screen 202 is shown in FIG. 7.

The five layer circular orbits are displayed on the network selection menu screen 202. The respective layers correspond to the respective levels when the radio intensities of the discovered wireless devices are classified into five stages. Here, with the innermost layer as an orbit whose radio intensity is highest, and with the outermost layer as an orbit whose radio intensity is lowest, the wireless devices are displayed as objects in orbits corresponding to the radio intensities thereof. Here, the respective objects are displayed so as to be selectable by icons ST(1), ST(2), in the display screen which is imitative of stars (celestial bodies) orbiting in the outer space. Moreover, here, the stars (celestial bodies) are displayed at equal intervals so as to be not superposed on one another.

In the processing of displaying the discovered wireless devices (for example, the access points 20) on the network selection menu screen 202, the radio intensities of the discovered wireless devices are acquired from the data base 31 (step S141 in FIG. 7), the layer on which the objects are displayed is determined from the radio intensities (step S142), and the above-described discovered wireless devices are displayed as selectable objects by icons ST(1), ST(2), etc. in the display screen which is imitative of stars (celestial bodies) in an orbit of the layer (step S143). Further, the celestial bodies (icons) in the orbit are made to travel and orbit in the orbit in the direction of the arrow "a" shown in FIG. 2 at a predetermined speed.

Figure 9A:
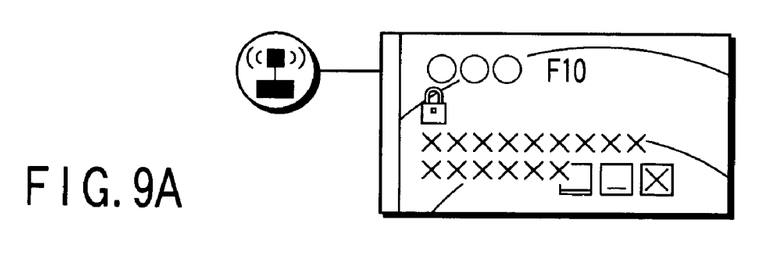
FIGS. 9A and 9B are diagrams illustrating display examples of the user interface according to the embodiment of the invention.
Figure 9B:
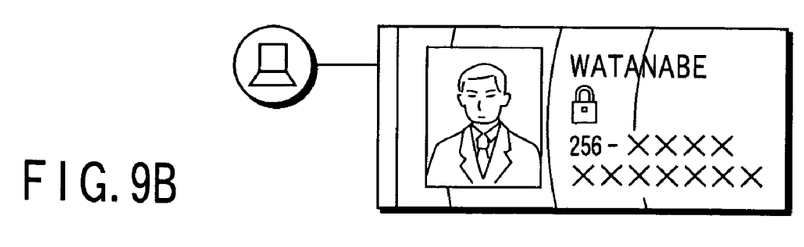

At this time, when the respective objects of the discovered wireless devices pass over the focus line (BL), the detailed information of the objects are displayed within a predetermined focus area (between BL and SL) which has been determined in advance. These display examples are shown in an enlarged manner in FIGS. 9A and 9B. FIG. 9A shows standard detailed information when the object is the access point (AP) 20 of the wireless LAN. FIG. 9B shows the detailed information example when the object is a wireless ad hoc (ad hoc). By adding, for example, sound or the like to the displays, the user can intuitively, easily, and clearly grasp the highly reliable and well-known objects existing within the communication area. Note that the detailed information at this time is generated on the basis of the stored information in the above-described data base 31.

Figure 10A:
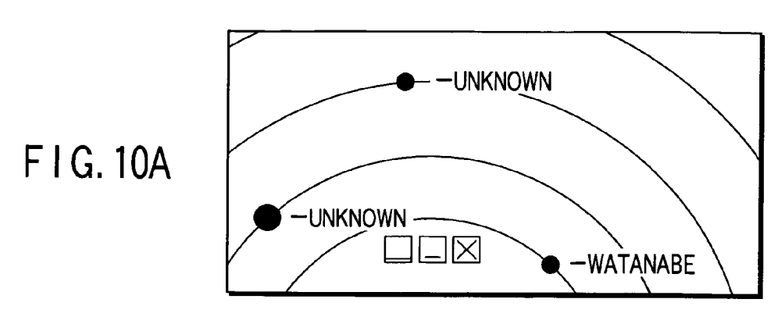
FIGS. 10A and 10B are diagrams illustrating display examples of the user interface according to an embodiment of the invention.
Figure 10B:
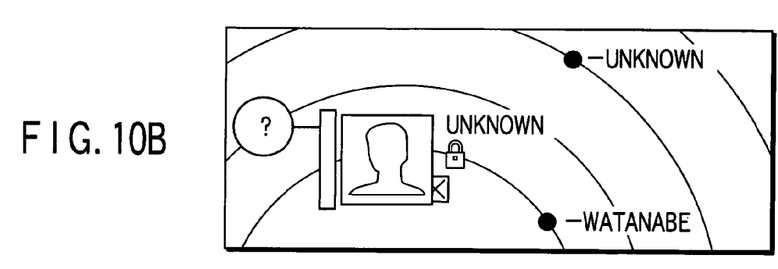

The display screen examples of the objects in the above-described orbits are shown in an enlarged manner in FIGS. 10A and 10B. FIGS. 10A and 10B respectively show the display examples of unregistered objects. The unregistered object is clearly denoted by text "UNKNOWN" in FIG. 10A, and the unregistered object is clearly denoted by a balloon in FIG. 10B. At this time, in addition to the text display of "UNKNOWN", for example, by varying the color, the shape, the image, or the like of the object (icon) or by making to flicker, and moreover, by signaling by sounds or the like, the user can clearly grasp the presence of the unregistered wireless devices within the communication area.

Under the above-described display state, when one object is selected by, for example, a mouse cursor (YES in step S151 in FIG. 7), and connection or disconnection of the wireless communication path is instructed by a predetermined operation or on a screen (step S152), a confirmation portion image display screen is informed of the instructed content, the connection or disconnection of the selected wireless device is carried out (step S153 or S154), and the processing of the communication environment display control program 140 is completed.

Figure 11:
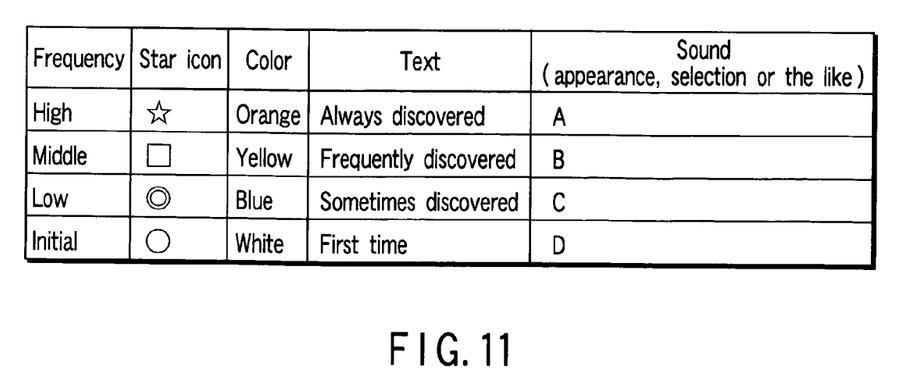
FIG. 11 is a diagram showing a display example of the user interface according to an embodiment of the invention.

FIG. 11 shows an example in which display screens of the object are varied by using the number of discoveries counted on the above-described data base 31. An example in which the number of discoveries (detecting frequency) is displayed to be classified into four stages is shown.

Figure 12:
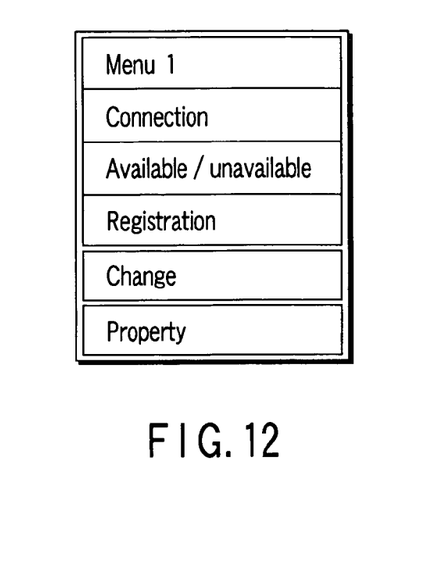
FIG. 12 is a diagram showing a display example of the user interface according to an embodiment of the invention.

FIG. 12 shows a menu display example when an object is selected at step S151 in FIG. 7 as described above. When the object in orbit is selected by a mouse cursor, due to the menu thereof being displayed at the position of displaying the object, it is possible to select the menu.

Figure 13:
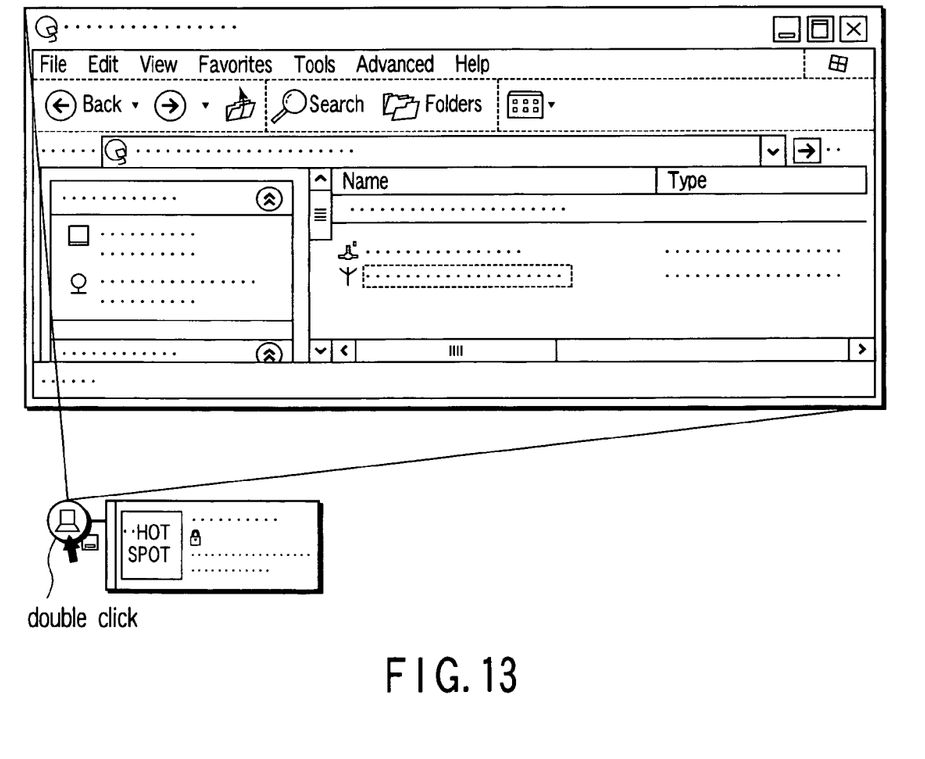
FIG. 13 is a diagram showing a display example of the user interface according to an embodiment of the invention.

FIG. 13 shows an example of a configuration of connecting utility execution screen displayed when the above-described object in orbit is double-clicked by a mouse. By providing such a function of displaying an execution screen, a launcher function of executing commands registered in advance is achieved, so that processing of the connection of communication, or the like can be easily, rapidly, and effectively executed.

Note that, as a concrete setting example on the connecting utility execution screen at this time, for example, a setting example of a usage resource disclosed in Japanese Patent Application No. 2002-300548 (Information Processing Apparatus and Communication Environment Setting Method) can be sampled.

According to an embodiment of the invention, a user interface detects the presence, the connecting performances, and the reliabilities of wireless devices in real-time, and displays a list of the wireless devices which have been detected each occasion so as to be selectable and understandable on a screen showing the outer space such as, for example, the solar system or the galactic system.

According to another embodiment of the invention, an information processing apparatus comprises discovered wireless devices in the surroundings, and a list displaying of the wireless devices which have been discovered with an accompanied a predetermined action so as to be selectable.

According to still another embodiment of the invention, an information processing program comprises a program code for monitoring wireless devices in the surroundings and for discovering communicatable wireless devices, and a program code for displaying a list of the discovered communicatable wireless devices by a cosmic diagram in which the discovered wireless devices are regarded as stars.

According to such a user interface, for example, the current wireless communication environment during the time of carrying the device can be easily and rapidly grasped without any complicated operation by a user, and a communication environment each occasion can be effectively used without a usage place being specified. For example, by monitoring a wireless device in the surroundings which can be communicated with the user's own device during the time of carrying thereof, and by regarding the discovered wireless devices as stars (celestial bodies) which orbit the outer space as objects to be communication objects, and list-displayed on the screen expressing the outer space, an object which can currently communicate with the user's own device can be easily and rapidly recognized, so that a communication environment each occasion can be utilized. Therefore, communication environments can be easily and in detail recognized on the wireless devices in the surroundings thereof.

While the description above refers to particular embodiments of the invention, it will be understood that many modifications may be made without departing from the spirit thereof. The accompanying claims are intended to cover such modifications as would fall within the true scope and spirit of the invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein. For example, an embodiment can be practiced as a computer readable recording medium comprising a program for allowing the computer to perform predetermined functions, allowing the computer to realize a predetermined function, or allowing the computer to conduct predetermined functions.

What is claimed is:

1. An information processing apparatus comprising:
   a wireless communication unit which discovers wireless devices existing in surroundings; and
   a display unit which displays a list of the discovered wireless devices as selectable objects in which display icons of the objects are displayed based on radio intensities of the discovered wireless devices, wherein the list of the discovered wireless devices comprises a discovered wireless device selection screen in which the display icons of the discovered wireless devices are displayed as celestial bodies in an orbit, wherein the celestial bodies in the orbit imitate a solar system in outer space wherein the discovered wireless device selection screen comprises a small scale monitor screen which displays the orbit in a reduced scale, and a network selection menu screen which displays the orbit in an enlarged scale, wherein the network selection menu screen displays the icon of the discovered wireless device as a selectable object in one of a plurality of concentric circular orbits, and wherein the one of the concentric circular orbits is selected based on the radio intensity of the discovered wireless device, wherein the icon is displayed on the selected circular orbit.

2. The apparatus of claim 1, wherein the small scale monitor screen displays the icon of the discovered wireless device in one of a plurality of concentric elliptical orbits.

3. The apparatus of claim 2, wherein the small scale monitor screen displays sets of selectable object screens formed of concentric elliptical orbits, wherein the sets of selectable object screens are in units of wireless local area network communication environments, units of wireless ad hoc network communication environments, or units of classes of a network.

4. The apparatus of claim 3, wherein the network selection menu screen displays a wireless device selection screen formed of concentric circular orbits, the wireless device selection screen corresponding to a selected one of the sets of selectable object screens.

5. The apparatus of claim 1 further comprising:
   a detection unit which detects that the icon displayed for the network selection menu screen is selected; and
   a launcher unit which executes a command registered in advance when the detection unit detects that the icon is selected.

6. The apparatus of claim 5, wherein a connecting utility execution screen displays the wireless devices corresponding to the selected icons as communication connectable objects.

7. The apparatus of claim 1, further comprising:
   a data base which manages the discovered wireless devices;
   an acquire unit which acquires object data of the discovered wireless devices; and
   a registration unit which registers the acquired object data in the data base.

8. The apparatus of claim 7, wherein the object data comprises at least one of an identifier of the discovered wireless devices, a radio intensity of the discovered wireless devices, a display item of the discovered wireless devices, a number of discoveries, an access point name, a local area network model, a connection history, a photograph of a face, a connection name, a device name, text, an image, and a sound.

9. The apparatus of claim 7, wherein the network selection menu screen comprises a focus line extending from a center of the screen in a radial pattern, wherein details of the discovered wireless device are displayed within a predetermined focus area, including the focus line, based on the object data acquired by the acquire unit when the display icon of the discovered wireless device passes over the focus line.

10. The apparatus of claim 7, wherein the network selection menu screen comprises a focus line extending from a center of the screen in a radial pattern, wherein details of the discovered wireless device are displayed within a predetermined focus area, including the focus line, based on the object data registered in the data base when the display icon of the discovered wireless device passes over the focus line.

11. The apparatus of claim 1, wherein the display icons of the objects are accompanied by predetermined movements.

12. A computer readable medium having stored thereon instructions that, when executed by a computer, cause the computer to:
   discover wireless devices existing in surroundings; and
   display a list of discovered wireless devices as selectable objects in which display icons of the objects are displayed based on radio intensities of the wireless devices, wherein the list of discovered wireless devices comprises a discovered wireless device selection screen in which the discovered wireless devices are displayed as celestial bodies in an orbit, the celestial bodies in the orbit imitate a galactic system in outer space, and the discovered wireless device selection screen comprises a small scale monitor screen which displays the orbit in a reduced scale, and a network selection menu screen which displays the orbit in an enlarged scale, wherein the network selection menu screen displays the icon of the discovered wireless device as a selectable object in one of a plurality of concentric circular orbits, and wherein the one of the concentric circular orbits is selected based on the radio intensity of the discovered wireless device, wherein the icon is displayed on the selected circular orbit.

13. The computer readable medium of claim 12, wherein the display icons are accompanied by a predetermined movement.

14. The computer readable medium of claim 12, wherein the network selection menu screen comprises a focus line extending from a center of the screen in a radial pattern, wherein details of the discovered wireless device are displayed within a predetermined focus area, including the focus line, based on object data acquired by an acquire unit when display icons of the discovered wireless devices pass over the focus line.

15. The computer readable medium of claim 12, wherein the network selection menu screen comprises a focus line extending from a center of the screen in a radial pattern, wherein details of the discovered wireless device are displayed within a predetermined focus area, including the focus line, based on object data registered in a data base when display icons of the discovered wireless devices pass over the focus line.

16. An information processing method comprising:

discovering with a wireless communication unit available wireless devices;

displaying a list of the discovered available wireless devices as selectable objects, in which display icons of the objects are displayed based on radio intensities of the discovered available wireless devices; and displaying the display icons of the discovered available wireless devices as celestial bodies in an orbit, wherein the list of discovered wireless devices comprises a discovered wireless device selection screen in which the discovered wireless devices are displayed as celestial bodies in an orbit, the celestial bodies in the orbit imitate a galactic system in outer space, and the discovered wireless device selection screen comprises a small scale monitor screen which displays the orbit in a reduced scale, and a network selection menu screen which displays the orbit in an enlarged scale, wherein the network selection menu screen displays the icon of the discovered wireless device as a selectable object in one of a plurality of concentric circular orbits, and wherein the one of the concentric circular orbits is selected based on the radio intensity of the discovered wireless device, wherein the icon is displayed on the selected circular orbit.

17. The method of claim 16, further comprising moving the display icons with predetermined movements.

18. The method of claim 16, further comprising:

managing the discovered available wireless devices with a data base;

acquiring object data of the discovered wireless devices; and registering the acquired object data in the data base.

19. An information processing apparatus comprising:

means for discovering available wireless devices; and means for displaying a list of the discovered available wireless devices as selectable objects, in which display icons of the objects are displayed based on radio intensities of the discovered available wireless devices, wherein the means for displaying the list of the discovered available wireless devices comprises a discovered wireless device selection screen in which the display icons of the discovered available wireless devices are displayed as celestial bodies in an orbit, wherein the celestial bodies in the orbit imitate a solar system in outer space, and the discovered wireless device selection screen comprises a small scale monitor screen which displays the orbit in a reduced scale, and a network selection menu screen which displays the orbit in an enlarged scale, wherein the network selection menu screen displays the icon of the discovered wireless device as a selectable object in one of a plurality of concentric circular orbits, and wherein the one of the concentric circular orbits is selected based on the radio intensity of the discovered wireless device, wherein the icon is displayed on the selected circular orbit.

20. The apparatus of claim 19, wherein the small scale monitor screen displays the icon of the discovered available wireless device in one of a plurality of concentric elliptical orbits.

* * * * *